(12) United States Patent
Reissenweber

(10) Patent No.: US 7,469,568 B2
(45) Date of Patent: Dec. 30, 2008

(54) DEVICE FOR HANDLING A WORKPIECE DURING A SHAPING PROCESS

(75) Inventor: Frank Reissenweber, Sesslach (DE)

(73) Assignee: Langenstein & Schemann GmbH, Coburg (DE)

(*) Notice: Subject to any disclaimer, the term of this patent is extended or adjusted under 35 U.S.C. 154(b) by 388 days.

(21) Appl. No.: 10/558,657

(22) PCT Filed: May 8, 2004

(86) PCT No.: PCT/EP2004/005780

§ 371 (c)(1),
(2), (4) Date: Nov. 29, 2005

(87) PCT Pub. No.: WO2004/108322

PCT Pub. Date: Dec. 16, 2004

(65) Prior Publication Data

US 2007/0018370 A1 Jan. 25, 2007

(30) Foreign Application Priority Data

Jun. 5, 2003 (DE) .............................. 103 25 902
Mar. 31, 2004 (DE) ....................... 10 2004 015 675

(51) Int. Cl.
*B21D 43/10* (2006.01)

(52) U.S. Cl. ............................. 72/422; 72/361; 72/421; 72/466

(58) Field of Classification Search .................. 72/361, 72/407, 408, 419, 420, 421, 431, 446, 449, 72/465.1, 466, 466.8, 311, 422

See application file for complete search history.

(56) References Cited

U.S. PATENT DOCUMENTS

| 4,878,373 | A | * | 11/1989 | Wilson et al. ................. 72/420 |
| 5,000,028 | A | * | 3/1991 | Krieger ....................... 72/421 |
| 5,761,951 | A | * | 6/1998 | Codatto ....................... 72/420 |
| 6,722,178 | B1 | * | 4/2004 | Ito et al. ...................... 72/420 |
| 6,938,454 | B2 | * | 9/2005 | Strasser et al. ................ 72/420 |
| 7,168,282 | B2 | * | 1/2007 | McLean ...................... 72/356 |
| 2006/0169017 | A1 | * | 8/2006 | Bauersachs et al. ........... 72/311 |

FOREIGN PATENT DOCUMENTS

| DE | 4220796 | 1/1994 |
| DE | 10060709 | 6/2002 |
| JP | 8090133 | 4/1996 |

* cited by examiner

*Primary Examiner*—Edward Tolan
(74) *Attorney, Agent, or Firm*—Workman Nydegger

(57) ABSTRACT

A device for handling a workpiece during a shaping process includes at least one gripping mechanism having at least two gripping elements that can move relative to one another for grasping the workpiece; at least one conveying device for conveying the gripping mechanism or at least one support apparatus to which the gripping mechanism is or may be attached; and at least one rotary drive for rotating the gripping mechanism about a rotational axis that extends through the gripping mechanism, and/or for rotating at least one of the gripping elements about a rotational axis that extends through the gripping element. The conveying device and the gripping mechanism can be connected to one another in a flexible manner in a flexible state while being positioned relative to one another in a rigid manner at least in one three-dimensional direction.

35 Claims, 4 Drawing Sheets

DEVICE FOR HANDLING A WORKPIECE DURING A SHAPING PROCESS

This application is a 35 USC 371 of PCT/EP04/05780 filed May 8, 2004.

BACKGROUND OF THE INVENTION

1. Field of the Invention

The invention relates to a device for handling a workpiece during a shaping process.

2. Background and Related Art

DE 42 20 796 A1 discloses a handling device for holding a forged piece during a forging process, in which a traveling mechanism carries a gripping mechanism via a sleeve, the gripping mechanism having vise-grip pincers that grasp the forged piece during the forging process. The sleeve has a hydraulic chamber, and optionally may be brought into a flexible state and a rigid state by changing the internal pressure in the hydraulic chamber via a control valve.

A further device for handling a forged piece during a forging process is known from DE 100 60 709 A1, in which an oblong gripper on its one end is mounted on a support apparatus, and on its other end has a gripping mechanism with vise-grip pincers, between whose two pincer jaws the forged part or workpiece can be held. A pincer lever on the vise-grip pincers which supports one of the pincer jaws is stationarily mounted in the longitudinal direction of the gripper, while a pincer lever supporting the other pincer jaw can be brought from an opened to a closed position by swiveling via a pincer actuating device in order to clamp the workpiece between the pincer jaws, or, conversely, can be brought from the closed to the opened position to release the workpiece. A gripping arm of the gripper is connected to the vise-grip pincers, and a block piece made of an elastically deformable material is connected to the gripping arm. On its side facing away from the gripping arm, the resilient or flexible block piece is connected to an arm region which by means of a first electromotor may be pivoted up and down, and by means of a second electromotor, raised and lowered. These motions are synchronized by a control device. The handling device may be designed as a manipulator or robot.

Due to the flexibility of the block piece, the front region of this known gripper, comprising the gripping arm, vise-grip pincers, and pincer actuating device, is flexible or pivotable with respect to the rear region comprising the arm region and the drive motors, the block piece being used as a type of articulating joint or swivel bearing. If the gripper now places a forged workpiece on a forging die of a forging hammer, and the striking tool strikes the workpiece, vibrations or impacts thus produced which are transmitted to the vise-grip pincers and gripper may become damped and absorbed in the elastic block piece, thereby relieving the load on the drives. This allows the forging process, which in practice is still carried out manually, to be automated for holding the workpiece in the forging hammer.

In this handling device known from DE 100 60 709 A1, before or after the actual shaping process in the forging hammer, in particular for moving toward or away from the forging hammer for handling the workpiece, a rigid control rod is also provided which bridges the elastic block piece and produces a rigid connection between the gripping arm and the arm region on the two mutually facing sides of the block piece. The rigid control rod has a pin that engages from below into a cavity in the gripping arm. When the rigid control rod is engaged with the gripping arm, the arm region and the gripping arm are coaxially aligned with one another along the longitudinal direction of the gripper. The intrinsic weight of the front parts, in particular the vise-grip pincers, pincer actuating device, and gripping arm, holds the rigid control rod in position and ensures an essentially horizontal fixed position of the entire gripper during transport of the grasped workpiece.

To release this fixed position, when the workpiece is placed on the forging die of the forging hammer the rear arm region is lifted upward, so that it is oriented at an angle to the longitudinal direction of the front gripper region having the vise-grip pincers, and the block piece is correspondingly deformed or bent. The fixation of the rigid control rod to the gripping arm is thereby released, since the pin is swiveled out of the cavity and the rigid control rod then is no longer connected to the front gripping arm. When the rigid control rod is released, on account of its flexibility the block piece can then carry out its function as a damping element for the impacts and vibrations. To rigidly reposition the gripper, the rear arm region is simply lowered down again into a coaxial position with respect to the front arm, and the rigid control rod is again fixed to the front gripping arm by reengaging the pin in the cavity.

The motion of this known robotic handling system according to DE 100 60 709 A1 is composed of essentially a horizontal and a vertical motion produced by the second electromotor. The swivel motion produced by the first motor before the actual forging process when the workpiece is laid out serves only to release or fix the rigid control rod. The workpiece is thus constantly held in a position in which its upper and lower sides always extend horizontally, and undergoes only horizontal or vertical translatory motion. Rotation of the workpiece is not described.

BRIEF SUMMARY OF THE INVENTION

The object of the present invention is to enable more complex motions of the workpiece during the shaping process, in particular before a shaping step or between two shaping steps, in particular, to enable rotation of the workpiece. In addition, preferably the handling device known from DE 100 60 709 A1 is to be correspondingly refined.

This object is achieved according to the invention by the features of claim 1.

The device for handling a workpiece during a shaping process, in particular a forging process, comprises a) at least one gripping mechanism having at least two gripping elements that can move relative to one another for grasping the workpiece, b) at least one conveying device (or moving device) for conveying (or moving) the gripping mechanism or at least one support apparatus to which the gripping mechanism is or may be attached, c) at least one rotary drive for rotating the gripping mechanism about a rotational axis that extends through the gripping mechanism, and/or for rotating at least one of the gripping elements about a rotational axis that extends through the gripping element, d) the conveying device and the gripping mechanism, or at least one support apparatus to which the gripping mechanism is or can be attached, being connected to one another in a flexible manner in a flexible state while being essentially connected to one another in a rigid manner or being positioned relative to one another in a rigid manner at least in one three-dimensional direction and/or in each rotational position of the gripping mechanism and/or the gripping element(s) in a rigid state.

BRIEF DESCRIPTION OF THE DRAWINGS

The ability of the gripping means, namely, the entire gripping mechanism and/or the gripping elements, to rotate or swivel provided according to the invention allows the grasped workpieces to be handled with greater degrees of freedom, in particular a rotation or swiveling of the grasped workpieces, preferably about their own rotational axes or rotational axes extending through the workpieces, for example for material predistribution during forging. The flexible connection of the gripping mechanism and/or support apparatus and conveying device in the flexible state results in at least partial absorption or damping of impacts or vibrations that are transmitted from the workpiece in the shaping machine to the gripping mechanism during the shaping process, thereby protecting the conveying device from these mechanical stresses. In contrast, the rigid connection or position of the gripping mechanism and/or support apparatus and conveying device in the rigid state is used when the workpiece is handled during transport, or during rotation or swiveling before or after the shaping steps.

Advantageous embodiments and refinements of the handling device and a method for shaping a workpiece using a handling device according to the invention result from the claims dependent on claim 1.

Figure 1:
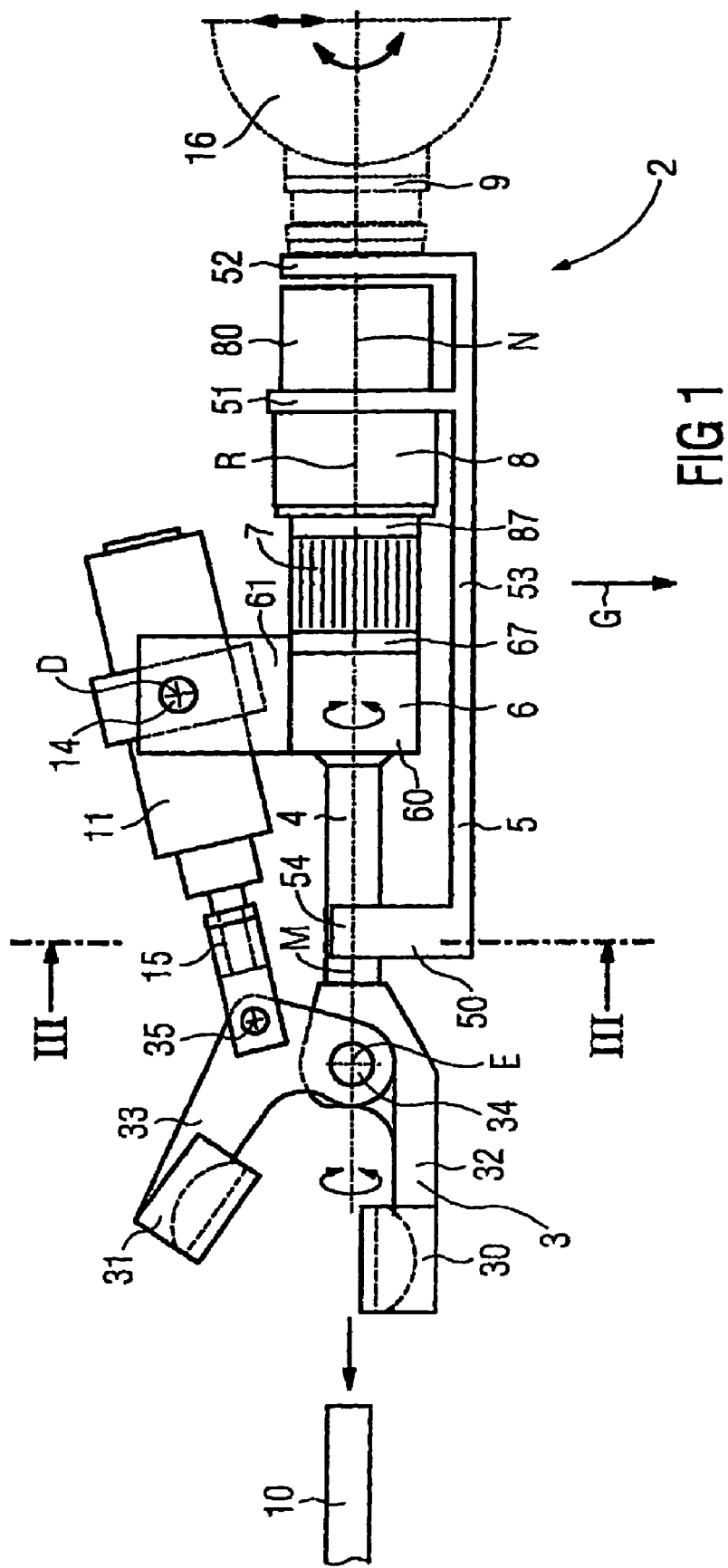

In a first embodiment for achieving the flexible state and the rigid state in the positioning or connecting of the gripping mechanism and/or support apparatus and conveying device, at least one connecting element between the gripping mechanism and/or support apparatus and conveying device is provided which may be adjusted in a flexible or rigid manner by, in particular, hydraulic impingement at various internal pressures, for example, a sleeve according to aforementioned DE 42 20 796 A1.

In a second preferred embodiment for achieving the flexible state and the rigid state, at least one flexible element is provided between the gripping mechanism and/or support apparatus and conveying device, generally a (permanently) elastic element, by which the gripping mechanism and/or support apparatus and conveying device in the flexible state are connected practically exclusively to one another. In the rigid state, the flexible element is or becomes bridged (or a bypass is created) by at least one support device which essentially supports the gripping mechanism and/or support apparatus and conveying device on or against one another, thereby achieving the desired rigid position of same. For this embodiment, a rigid control device of the type in aforementioned DE 100 60 709 A1, for example, may be used.

The, or each, rotary drive generally comprises at least one electrical drive motor. The drive motor is preferably a servomotor or a similar continuously controllable motor for setting any given (intermediate) angular position. The rotational angle position is thus known at any time, and during a translatory motion of the handling device this device can be simultaneously rotated to increase the handling speed. Otherwise, a rotational angle or limit detection device is provided which detects a limit at the provided (end) rotational angle position and relays this information to the controller for the handling device. This is particularly advantageous when a pneumatic or hydraulic rotary drive is provided.

In one particularly advantageous embodiment, the rotary drive(s) for rotating the entire gripping mechanism is/are situated on the side of the flexible element or connecting element facing away from the gripping mechanism and/or support apparatus, in particular between the flexible element or connecting element and the conveying device. This embodiment also decouples the rotary drive from the shaping impacts. The flexible element or connecting element is then preferably used to transmit the torque of the rotary drive to the gripping mechanism, and is thus used essentially as a rotary coupling. To this end, a drive shaft of the drive motor can be connected in a rotationally fixed manner via a flange to the flexible element or connecting element. Alternatively, a flexible shaft for transmitting the rotation from the rotary drive to the gripping mechanism may also be provided.

Furthermore, in one alternative embodiment the rotary drive for rotating the gripping mechanism may also be situated on the side of the flexible element or connecting element facing away from the conveying device, i.e., on the same side as the gripping mechanism and/or its support apparatus, in particular between the flexible element or connecting element and the gripping mechanism and/or support apparatus.

The support apparatus is generally designed to rotate along with the gripping mechanism when the latter rotates, i.e., it is connected to the gripping mechanism in a rotationally fixed manner.

In one particularly advantageous embodiment of the handling device, the gripping mechanism and/or support apparatus in the supported state are supported in a support bearing, this support bearing for the support device preferably forming a rotary bearing for the gripping mechanism and/or support apparatus, wherein the gripping mechanism and/or support apparatus rotate or are rotatable when the gripping mechanism rotates. The gripping mechanism is therefore freely rotatable in a simple manner, even in the supported state. The support bearing and the gripping mechanism and/or support apparatus in particular have essentially cylindrical contact or support surfaces. The support apparatus preferably has a support shaft that can be supported in the support device, in particular in the support bearing.

In one preferred embodiment, at least one locking device is provided, which in the rigid state interlocks (or couples) at least one support device with the gripping mechanism or support apparatus and/or conveying device, and in the flexible state again releases or does not interlock with same. The locking device is preferably mounted on the support bearing, and, together with the support bearing, preferably forms a rotating limiting and/or bearing device for the gripping mechanism or support apparatus, so that these cannot fall out, even during a rotation of 360°.

The gripping mechanism generally has an actuating device for moving the gripping elements with respect to one another. The actuating device in particular is mounted in or on a carrier part of the support apparatus which preferably is situated between the support shaft and the flexible element. In one preferred embodiment the gripping mechanism also has, for example in the manner of pincers, at least two gripping levers that can be swiveled with respect to one another in a swivel bearing, each gripping lever bearing at least one gripping element. Preferably, one of the two gripping levers is then directly connected to the support apparatus, and the other gripping lever is coupled to the actuating device. The actuating device swivels the second gripping lever with respect to the first gripping lever in the swivel bearing.

The support device preferably is attached to the conveying device and/or to the drive housing of the rotary drive.

The gripping elements of the gripping mechanism are generally mounted in a passively rotatable manner, in particular in a self-adjusting manner, it being possible to provide stops for limiting the swivel motion. The swiveling of the gripping jaws can at least partially compensate for twisting, deformation, or breaking out of the ends of the workpiece during shaping, particularly during bending. In addition, in a special embodiment, for rotation of the gripping elements of the gripping mechanism about a respective associated rotational axis at least one, or one respective, rotational drive can be provided.

In one embodiment, the rotational motion of the gripping mechanism and/or the gripping element(s) is limited to a predetermined angular range, in particular by appropriate limiting means, stops, or the like, or control of the drives. This predetermined angular range is generally at least 90°, in particular 45°, past both sides of a starting position, and preferably at least 180°, in particular 90°, past both sides of a starting position.

However, full rotation is also possible, for example, by 360°, or even several or any given number of multiple revolutions. This embodiment preferably is combined with the embodiment of a closing device for the support device, so that during full rotation the support apparatus or the gripping mechanism remain supported or enclosed and cannot fall out.

The rotatability of the gripping means (gripping mechanism and/or gripping elements) in the handling device according to the invention then allows a method for shaping a workpiece to be automated, wherein the workpiece must be rotated in one process step, for example, by combining a bending step with an actual forging step, flattening, during preliminary and final forging, and/or during forging in various gravures.

The shaping method according to the invention comprises the following process steps:
a) Preparing at least one workpiece,
b) Grasping the workpiece, conveying the workpiece to a shaping machine, and positioning the workpiece in a predetermined shaping position (in the shaping machine) by means of at least one handling device according to the invention,
c) Shaping the workpiece in at least one shaping step in the shaping machine,
d) Rotating or swiveling the workpiece, before or after a shaping step or between two shaping steps, by the handling device by rotating the gripping mechanism and/or gripping element(s) of the handling device, and preferably also the additional process step
e) Conveying the shaped workpiece by means of at least one handling device to a workpiece deposit station (or receiving area for the shaped workpieces).

For the rotational or swiveling motion of the workpiece, in many cases a swivel angle of at least 90°, in particular at least 180° or at least 360°, is selected, and/or a continuous or semi-continuous rotation and/or a setting in practically any given rotational position. A rotational or swivel angle of approximately 90° is often selected to allow bending of the workpiece in one direction and changing its cross section in a direction orthogonal thereto, and/or to achieve material predistribution for better adaptation to a forged gravure.

In one particularly advantageous embodiment, during the shaping or the shaping step the workpiece is held by at least one handling device according to the invention, preferably held at different ends by at least two handling devices according to the invention. In this manner the workpiece can be prevented from bouncing when it meets the shaping tool, and the workpiece can be held in its shaping position.

The handling device finds a preferred application in a shaping process having a forging hammer or a screw press as the shaping machine, although of course other shaping machines, such as hydraulic presses, for example, are possible.

Figure 2:
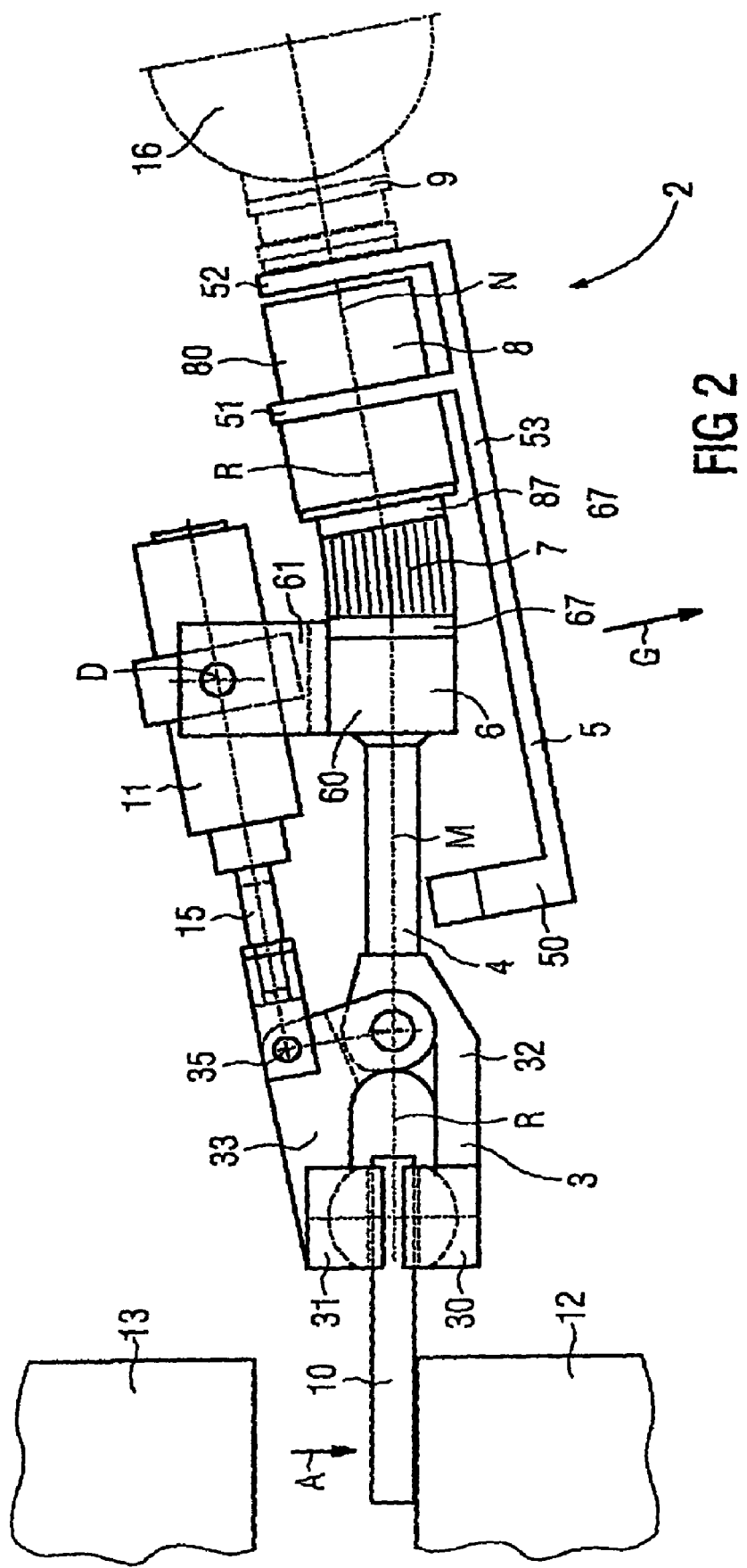
Figure 3:
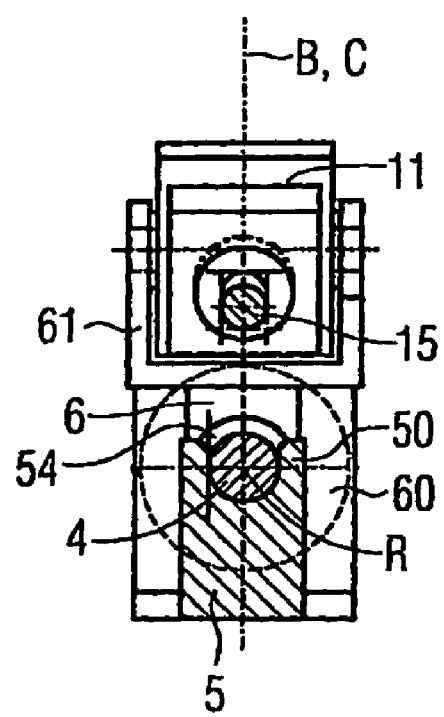
Figure 4:
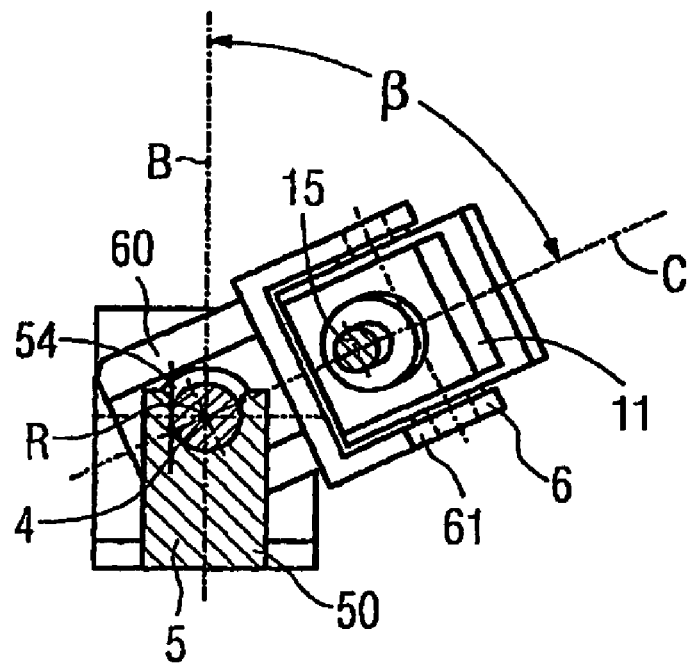
Figure 5:
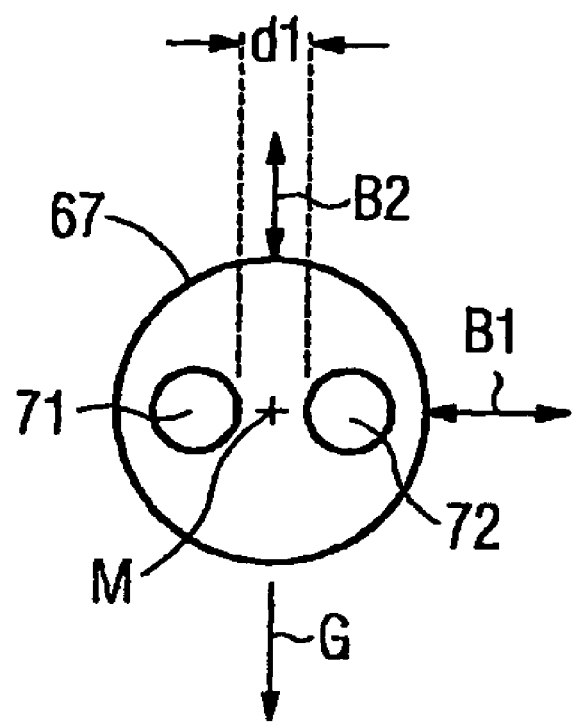
Figure 6:
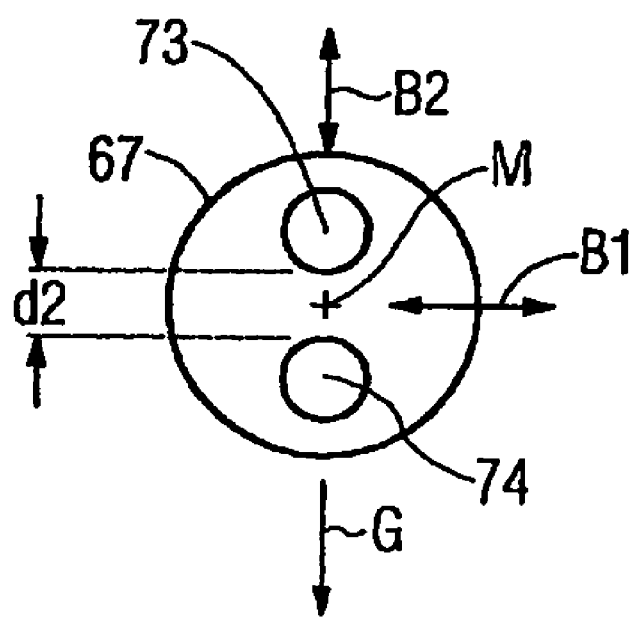

The invention is further explained below, with reference to exemplary embodiments. In this regard reference is made to the drawings, wherein FIG. 1 shows a handling device having an opened gripping mechanism before grasping a workpiece, in a side view, FIG. 2 shows the handling device according to FIG. 1, with the workpiece grasped in the closed gripping mechanism and placed in a shaping machine, in a side view, FIG. 3 shows a cross section through the handling device according to FIG. 1, in the sectional plane described by III-III, FIG. 4 shows a section according to FIG. 3, with the gripping mechanism and actuating device swiveled, FIG. 5 shows an embodiment with two elastic elements situated next to one another, in a sectional view, and FIG. 6 shows an embodiment with two elastic elements situated on top of one another, in a sectional view,

DETAILED DESCRIPTION OF THE PREFERRED EMBODIMENTS each in schematic representation. Corresponding variables and parts are provided with identical reference numbers in FIGS. 1 through 4. A handling device (or manipulator, robot) is designated by reference number 2, a gripping mechanism (or gripping pincers) by 3, a support shaft (or transmission shaft) by 4, a support device (or rigid control device) by 5, a carrier part by 6, a flexible element by 7, a rotary drive by 8, an articulated joint by 9, a workpiece by 10, an actuating device for opening and closing the gripping mechanism 3, by 11, a lower tool (or forging die) of a forging hammer by 12, an upper tool of the forging hammer by 13, and a conveying device by 16.

The gripping mechanism 3 comprises two gripping levers (or pincer levers) 32 and 33 which are able to swivel with respect to one another about a swivel axis E in a swivel bearing 34 for opening and closing the gripping mechanism 3. A gripping jaw (or gripping element, pincer jaw) 30 or 31 is provided on each of the associated gripping levers 32 or 33, respectively. FIG. 1 shows the gripping mechanism 3 in the opened state, in which the gripping mechanism 3, with gripping jaws 30 and 31 widely separated from one another, is moved toward a workpiece 10, in the direction of the illustrated arrow, by the conveying device 16.

To swivel the gripping lever 33 with respect to the gripping lever 32, an actuating device 11 is provided which in an engagement bearing 35 engages the gripping lever 33, and by means of a lifting cylinder, for example, or other drive, rotates the gripping lever 33 about the swivel bearing 34. The actuating device 11 is mounted in a swivel bearing 14 so as to swivel about a swivel axis D on a holding part 61, having a U-shaped cross section (FIGS. 3 and 4), of the carrier part 6 to enable the gripping mechanism 3 to open or close by moving the gripping lever 33, in cooperation with the motion in the engagement bearing 35 by shortening or lengthening the lifting cylinder of the actuating device 11.

The carrier part 6 further comprises an intermediate part 60 on which the holding part 61 is mounted and which is connected via the support shaft 4 to the gripping lever 32 of the gripping mechanism 3. The gripping lever 32, support shaft 4, and intermediate part 60 are positioned one behind the other (or coaxially) and are rigidly or stationarily connected with respect to one another, but rotatably about the axis M, and together with the holding part 61 and the actuating device 11 form a front unit of the handling device 2. The support shaft 4 and the carrier part 6 along with the intermediate part 60 and holding part 61 together form a support apparatus for the gripping mechanism 3 and its actuating device 11.

The flexible element 7 is attached on the side of the intermediate part 60 of the carrier part 6 facing away from the support shaft 4, and the flexible element in turn is connected to the other side having the pivot drive (or rotary drive) 8. A flange 67 or 87 is provided to respectively connect the flexible element 7 to the intermediate part 60 and to the pivot drive 8. The flexible element 7 in FIGS. 1 and 2 is made of an elastic material, preferably an elastomer, and is at least predominantly solid. The pivot drive 8 is rigidly or stationarily connected to the articulated joint 9 on the side facing away from the flexible element 7.

The pivot drive 8 and the articulated joint 9 are situated along a second axis N, preferably concentrically to this axis N, and form a rear unit of the handling device 2. The front unit of the handling device 2, namely, the gripping mechanism 3, support shaft 4, and carrier part 6, in addition to the actuating device 11 on the one hand, and the rear unit of the handling device 2, namely, the pivot drive 8 and articulated joint 9 in addition to the conveying device 16 on the other hand, are able to swivel with respect to one another in the flexible element 7. The axis M of the front unit and [the axis] N of the rear unit can thus be inclined or twisted with respect to one another by deformation of the flexible element 7. FIG. 1 shows the two units on one side and the other side of the flexible element 7 in a position wherein the two axes M and N coincide or run coaxially, while FIG. 2 shows a position wherein the axis N is swiveled upward by an angle α with respect to the axis M. In FIG. 1, axes M and N are positioned essentially horizontally, i.e., perpendicular to the gravitational force G. However, axes M and N may also be positioned at an inclination to the gravitational force G. Whereas in FIG. 1 the flexible element 7 is in an essentially undeformed straight configuration, in FIG. 2 it is in a configuration that is upwardly deformed or bent by the angle α as a result of the changed position of axes M and N relative to one another.

The support device 5 is rod-shaped or is designed in the manner of a rod, and comprises a longitudinal connecting rod 53 on which are situated a first fastening part 51 extending transversely upward for connecting the connecting rod 53 to the pivot drive 8, and further to the rear, a second fastening part 52 extending transversely upward for connecting the connecting rod 53 to the articulated joint 9, and in the front region an upwardly projecting fixed part or support part 50, transverse to the connecting rod 53, for fixing or supporting the support shaft 4. The support part 50 has a convex recess as a support bearing (or shaft seat) 54 adapted to the support shaft 4, in which the support shaft 4 is inserted or may be inserted.

In the state shown in FIG. 1, in which axes M and N run coaxially with respect to one another, the connecting rod 53 now runs parallel to these axes M and N, and the support part 50 supports the support shaft 4, and thus the gripping mechanism 3 connected thereto, in its support bearing 54. In this manner a supported or rigid connection is made between the front unit of the handling device 2 and the rear unit of the handling device 2 which bridges the flexible element 7. The support device 5 thus represents a quasi-mechanical bridge or bypass over the flexible element 7, and thus in the position according to FIG. 1 removes the flexibility of the handling device 2 in the flexible element 7, at least in the three-dimensional direction of the gravitational force G, and in the downwardly directed, lateral directions between the gravitational force G and the horizontal direction. In principle, the gripping mechanism 3 would still be upwardly bendable, since the bearing seat supports the support shaft 4 only from below via the support bearing 54. However, the rigid connection is maintained solely by the gravitational force G or the intrinsic weight of the parts of the handling device 2.

The intermediate part 60 of the carrier part 6 is connected in a rotationally fixed manner to the flexible element 7 via a connecting flange 67. On the opposite side, the flexible element 7 is connected in a rotationally fixed manner to the drive flange 87 of the rotary drive 8. The drive flange 87 is connected to a drive shaft of a drive motor situated in the drive housing 80 of the rotary drive 8, and is rotatable, relative to the drive housing 80, about the rotational axis R of the rotary drive 8.

The rotary motion via the rotary drive 8 may be limited to a specific angular range, or may also extend over the full 360° and over multiple rotations or revolutions. The rotation preferably occurs continuously by means of a servomotor, for example, or also in small steps by means of a stepping motor, for example. The accuracy is at least 1°, and as a rule, at least 0.1°.

A rotary motion of the rotary drive 8 is transmitted through the drive flange 87 to the flexible element 7, so that the rotary motion or torque is transmitted to the connecting flange 67. The material and design of the flexible element 7 must therefore be such that torque transmission is possible. For this reason, the modulus of elasticity of the elastomer must not be selected to be too high, and a comparatively solid design is advantageous.

The carrier part 6 which is connected to the connecting flange 65 [sic; 67] now rotates together with the actuating device 11 held in the holding part 61. The rotary motion is further transmitted via the support shaft 4 to the entire handling device 3.

FIGS. 3 and 4 show an exemplary embodiment for a swivel motion, in a sectional view through the lifting cylinder for the actuating device 11 and the support shaft 4, as well as the support device [sic; support part] 50 according to FIG. 1.

FIG. 3 shows the starting position, in which a center axis B of the support part 50 of the support apparatus 5 and a center axis C of the actuating device 11 and of the carrier part 6 coincide, and the actuating device 11 is thus positioned in the direction of the gravitational force G, seen from above the intermediate part 60 of the carrier part 6.

In FIG. 4, the front unit of the handling device 2 is now swiveled or rotated to the right, in the clockwise direction, about a swivel angle β. The support shaft 4 thereby rotates about the rotational axis R in its support bearing 54 in the support apparatus 5. The center axis C of the front unit, in particular of the carrier part 6 and actuating device 11, is now swiveled relative to the center axis B of the support device 5. Likewise, the gripping mechanism is swiveled relative to the original center axis B, about the same swivel angle β; i.e., the opening and closing motion of the two gripping levers 32 and 33 occurs along the center axis C, and is thus swiveled relative to the original center axis B. In this manner a workpiece 10 may be rotated about the corresponding swivel angle β.

In an embodiment not illustrated, it is also possible for the support bearing 54 to have an oblong hole- or O-shaped design, thereby enabling the support shaft 4 to fall out and allowing rotation by 360°. In particular, a catch or lock may also be provided which can be automatically engaged. Furthermore, in all the embodiments the support device 5 may be driven, in particular by a motor or pneumatically or hydraulically, and thus is controllable independent of the gravitational force G.

Instead of a single solid flexible element 7 as in FIGS. 1 and 2, it is also possible to connect multiple flexible elements in parallel or in series. In this manner the flexibility may be more finely adjusted, and in particular a different flexibility may be set more easily in various three-dimensional directions.

FIGS. 5 and 6 show two exemplary embodiments in which two flexible elements are provided in each case.

In FIG. 5, two flexible elements 71 and 72 are positioned essentially horizontally, i.e., in a direction or plane perpendicular to the gravitational force G, at a distance d1 left and right of the rotational axis M.

In contrast, in FIG. 6 two flexible elements 73 and 74 are positioned in a direction or plane parallel to the gravitational force G, specifically, above and below the rotational axis M. The distance between the flexible elements 73 and 74 is designated by d2. The flexible elements 71 through 74 in FIGS. 5 and 6 are shown with a cylindrical cross section, but may also have other cross sections and shapes.

The force or torque counteracting bending may be adjusted in a wide range by the distances d1 and d2, as well as by the choice of design and materials of the flexible elements 71 through 74. In FIGS. 5 and 6 a bending direction B1 is shown as a horizontal line, and a bending direction B2 is shown as a vertical line, each relative to the gravitational force G.

In the exemplary embodiment or the rotational position according to FIG. 5, it is easier to bend in bending direction B2 than in bending direction B1; i.e., the counteracting torque applied by the flexible elements 71 and 72 is smaller in bending direction B2 than in bending direction B1. The configuration of elements 71 and 72 according to FIG. 5 preferably is provided for the initial position, i.e., without rotation, of the handling device.

In contrast, in the embodiment or rotational position according to FIG. 6, with flexible elements 73 and 74 superposed, it is easier to bend in bending direction B1 than in bending direction B2. The position according to FIG. 6 results from the position according to FIG. 5 rotated by 90°, for example.

Instead of two flexible elements, configurations of any given number of flexible elements are also possible, which may be optimized according to the application.

Advantageous, for example, is the use of a cylindrical body, solid or provided with cavities, made of an elastic polymeric material such as vulcanized natural rubber or another elastomer, on each end face of which a cylindrical metal plate, made of steel, for example, is provided as a flexible element 7 or 71 through 74. The correspondingly designed flexible element 7 or 71, 72, 73, 74 from the two end face plates is preferably connected to the polymer body by screw connections, but may also be connected by permanent connections such as welding. The length of the flexible element 7 or 71 through 74, measured along the cylindrical axis, is generally greater than its diameter. As a rule, the radial elasticity is greater than the axial elasticity. The elastomeric body is capable of bearing an axial pressure load as well as a radial thrust load, in addition to a combined pressure and thrust load, in each case depending on the installation. Of course, the shape of the elastomeric body may be other than cylindrical, and, for example, may also be tapered in the center.

The function of the rotation of the gripping mechanism 3 for handling the workpiece 10 is explained in greater detail below.

In FIG. 1 the workpiece 10 is about to be grasped from a conveyor belt or another, in particular stationary, workpiece supply by the gripping mechanism 3. In this position the gripping mechanism 3 is in its vertical starting position; i.e., center axes B and C according to FIG. 3 coincide. The workpiece is now held in the gripping mechanism 3 and is conveyed to the shaping machine by the conveying device 16, where it is placed in the shaping position for shaping. The handling device 2 is held in a rigid state by the support device 5.

FIG. 2 shows the workpiece 10 in the laid-out state on the lower forging die 12 of a forging hammer. By raising the lower unit of the handling device 2, i.e., by inclining the center axis N of the rotary drive 8 and articulated joint 9 about the angle of inclination a relative to the center axis M of the front unit of the handling device 2 about the flexible element 7, the support device 5 is disengaged from the support shaft 4, since the support device 5 together with the rotary drive 8 and articulated joint 9 remain aligned along their axis N, and the support part 50 therefore is at a sufficient distance from the support shaft 4.

During the inclined motion about angle α, the forging die 12 over the workpiece is used as an abutment.

The striking tool or hammer together with the upper tool 13 of the forging hammer now strike the workpiece 10 in the striking direction A. Significant impact and vibrational stresses arise in the striking motion which are transmitted through the workpiece 10 to the gripping mechanism 3 and the entire handling device 2. However, the elastic element 7 now largely decouples these impacts or vibrations from the conveying device 16 and rotary drive 8, thereby protecting these drive devices from overload. FIG. 2 shows the gripping mechanism 3 in the vertical position during the forging process.

Depending on the workpiece 10 and the desired shaping process, however, in many shaping processes it may be necessary to rotate the workpiece 10, in particular about the axis extending through the workpiece 10, its longitudinal axis, for example, before placing it on the forging die 12. To this end, the workpiece 10 is grasped by the gripping mechanism 3 and in the supported state, i.e., in engagement with the support device 5 located in the support shaft 4, the gripping mechanism 3 together with the grasped workpiece 10 are rotated about the desired rotational angle β. The rotated or swiveled workpiece 10 is then placed again on a forging die or other swage region of the forging die 12, and is reshaped by the upper tool 13 or another tool. Such two-step or multi-step shaping processes occur, for example, during bending of a workpiece for material predistribution in a first forging process or forging step, and during subsequent flat shaping or forging (cross-sectional modification).

LIST OF REFERENCE NUMBERS

2 Handling device
3 Gripping mechanism
4 Support shaft
5 Support device
6 Carrier part
7 Flexible element
8 Rotary drive
9 Articulated joint
10 Workpiece
11 Actuating device
12 Forging die
13 Striking tool
14 Swivel bearing
15 Lifting cylinder
16 Conveying device
30, 31 Gripping jaw
32, 33 Gripping lever
34 Swivel bearing
35 Engagement bearing
50 Support part
51, 52 Fastening part
53 Connecting rod
54 Support bearing 60 Intermediate part
61 Holding part
65
67 Connecting flange
71, 72 Flexible element
73, 74 Flexible element
80 Drive housing
87 Drive flange
M Front axis
N Rear axis
A Impact direction
B, C Axis
D, E Swivel axis
F Swivel axis
G Gravitational force
R Rotational axis
d1, d2 Distance
B1, B2 Bending direction

The invention claimed is:

1. A device for handling a workpiece during a shaping process, in particular a forging process, comprising:
   a) at least one gripping mechanism having at least two gripping elements that can move relative to one another for grasping a workpiece;
   b) at least one conveying device for conveying one of:
      i) the at least one gripping mechanism; or
      ii) at least one support apparatus to which the at least one gripping mechanism is attached; and
   c) at least one rotary drive for performing at least one of:
      i) rotating the at least one gripping mechanism about a rotational axis that extends through the at least one gripping mechanism; and
      ii) rotating at least one of the at least two gripping elements about a rotational axis that extends through the at least one of the at least two gripping elements;
   wherein the at least one conveying device and the at least one gripping mechanism are connected to one another in a flexible manner in a flexible state while being connected to one another in a rigid manner:
      i) in at least one direction in space; or
      ii) in each rotational position of the at least one gripping mechanism;
   wherein the at least one gripping mechanism or the at least one support apparatus is connected to the at least one conveying device by at least one flexible element, such that:
      i) the flexible element connects the at least one gripping mechanism or the at least one support apparatus to the at least one conveying device in the flexible state; and
      ii) at least one support device that bridges the at least one flexible element supports the at least one gripping mechanism or the at least one support apparatus on or against the at least one conveying mechanism.

2. A handling device as recited in claim 1, wherein the at least one flexible element is or may be adjusted in a flexible or rigid manner by hydraulic impingement at various internal pressures.

3. A handling device as recited in claim 1, wherein at least one rotary drive for rotating the at least one gripping mechanism is situated on the side of the at least one flexible element facing away from one or both of the at least one gripping mechanism or the at least one support apparatus.

4. A handling device as recited in claim 3, wherein the at least one flexible element transmits the torque of the at least one rotary drive for rotating the at least one gripping mechanism.

5. A handling device as recited in claim 3, wherein the at least one rotary drive for rotating the at least one gripping mechanism is situated between the at least one flexible element and the at least one conveying device.

6. A handling device as recited in claim 1, wherein the at least one rotary drive for rotating the at least one gripping mechanism is situated on the side of the at least one flexible element facing away from the at least one conveying device.

7. A handling device as recited in claim 1, wherein at least one rotary drive comprises at least one electric drive motor, in particular a servomotor.

8. A handling device as recited in claim 7, wherein a drive shaft of the at least one electric drive motor is connected in a rotationally fixed manner by means of a flange to the at least one flexible element.

9. A handling device according to one claim 1, wherein the at least one rotary drive comprises a hydraulic drive or at least one pneumatic drive.

10. A handling device as recited in claim 1, wherein the at least one support apparatus rotates along with the at least one gripping mechanism when the at least one gripping mechanism rotates.

11. A handling device as recited in claim 1, wherein the at least one gripping mechanism and/or the at least one support apparatus in the supported state are supported by a support bearing of the at least one support device.

12. A handling device as recited in claim 11, wherein the support bearing for the at least one support device forms a rotary bearing for the at least one gripping mechanism or the at least one support apparatus, in which the at least one gripping mechanism or the at least one support apparatus rotate or are rotatable when the at least one gripping mechanism rotates.

13. A handling device as recited in claim 11, wherein the support bearing has an essentially cylindrical inner surface, and the at least one gripping mechanism or support apparatus have a cylindrical outer surface.

14. A handling device as recited in claim 1, wherein the at least one support apparatus has a support shaft that can be supported in the support device.

15. A handling device as recited in claim 3, wherein the at least one gripping mechanism has an actuating device for moving the at least two gripping elements with respect to one another.

16. A handling device as recited in claim 15, wherein the at least one support apparatus has a carrier part in which the actuating device is mounted.

17. A handling device as recited in claim 16, wherein the carrier part of the at least one support apparatus is situated between the support shaft and the at least one flexible element.

18. A handling device according to claim 15, wherein the at least one gripping mechanism has at least two gripping levers that can be swiveled with respect to one another in a swivel bearing, such that each gripping lever supports at least one of the at least two gripping elements.

19. A handling device as recited in claim 18, wherein one of the at least two gripping levers is directly connected to the at least one support apparatus, and the other of the at least two gripping levers is coupled to the actuating device, such that the other of the at least two gripping levers is able to swivel with respect to the first gripping lever in the swivel bearing.

20. A handling device as recited in claim 1, wherein the at least one support device is attached to the at least one conveying device.

21. A handling device as recited in claim 1, wherein the support device is attached to a drive housing of the at least one rotary drive.

22. A handling device as recited in claim 1, having at least one rotary drive for rotating the at least two gripping elements of the at least one gripping mechanism about a rotational axis of one or more components of the handling device.

23. A handling device as recited in claim 1, wherein at least one of the at least two gripping elements of the at least one gripping mechanism is rotatably mounted in a rotary bearing of the gripping mechanism about a rotational axis of the rotary bearing.

24. A handling device as recited in claim 23, wherein the at least one gripping mechanism or the at least two gripping elements rotate in a predetermined angular range.

25. A handling device as recited in claim 24, wherein the predetermined angular range is from at least 90° to at least 360°.

26. A handling device as recited in claim 23, wherein the at least one gripping mechanism or the at least two gripping elements rotates at least one or more complete revolutions about an axis of rotation.

27. A handling device as recited in claim 26, wherein one or a plurality of rotational positions can be established for rotation of one or both of the at least one gripping mechanism or the two or more gripping elements, such that the rotary drive can be regulated in one or more of small steps or of continuous motion.

28. A handling device as recited in claim 10, further comprising at least one locking device, which in the rigid state interlocks the at least one support device with the at least one gripping mechanism, at least one support apparatus, or at least one conveying device, but does not interlock with the at least one support device with the at least one gripping mechanism, at least one support apparatus, or at least one conveying device in the flexible state.

29. A handling device as recited in claim 28, wherein the locking device is provided on the support bearing for the at least one support device, and surrounds or encloses the at least one gripping mechanism or the at least one support apparatus, thereby preventing the gripping mechanism from falling out of the support bearing in any rotational position.

30. A method for shaping a workpiece in a shaping machine, wherein the workpiece is handled by at least one handling device, the method comprising:
   a) providing at least one gripping mechanism having at least two gripping elements that can move relative to one another for grasping the workpiece;
   b) providing at least one conveying device for conveying the at least one gripping mechanism or at least one support apparatus to which the at least one gripping mechanism is attached;
   c) providing at least one rotary drive for at least one of:
      i) rotating the at least one gripping mechanism about a rotational axis that extends through the at least one gripping mechanism;
      ii) rotating at least one of the at least two gripping elements about a rotational axis that extends through the at least one of the at least two gripping elements; and
   d) connecting the at least one conveying device and the at least one gripping mechanism, or the at least one support apparatus to which the at least one gripping mechanism is attached, to one another in a flexible manner in a flexible state while being positioning or connecting to one another in:
      i) a rigid manner at least in one three-dimensional direction; or
      ii) each rotational position of the at least one gripping mechanism or the at least two gripping elements in a rigid state;
   wherein the at least one gripping mechanism or the at least one support apparatus is connected to the at least one conveying device by at least one flexible element, such that:
      i) the flexible element connects the at least one gripping mechanism or the at least one support apparatus to the at least one conveying device in the flexible state; and
      ii) at least one support device that bridges the at least one flexible element supports the at least one gripping mechanism or the at least one support apparatus on or against the at least one conveying mechanism.

31. A method as recited in claim 30, further comprising:
   a) providing a workpiece;
   b) grasping the workpiece;
   c) conveying the workpiece to a shaping machine;
   d) bringing the workpiece into a predetermined shaping position; and
   e) shaping the workpiece in at least one shaping step in the shaping machine;
   wherein the workpiece is rotated or swiveled, before by the handling device by rotating one or both of the at least one gripping mechanism or at least one gripping elements of the handling device.

32. A method as recited in claim 31, wherein the workpiece is shaped in a forging hammer or a screw press as the shaping machine.

33. A method as recited in claim 32, wherein the workpiece is rotated by a swivel angle in a predetermined angular range of between at least 90° and at least 360°.

34. A method according to one of claim 33, wherein, during the shaping of the workpiece, the workpiece is held by at least one handling device.

35. A method as recited in claim 34, wherein the shaped workpiece is conveyed by the at least one handling device to a workpiece deposit station.

* * * * *

UNITED STATES PATENT AND TRADEMARK OFFICE
CERTIFICATE OF CORRECTION

PATENT NO. : 7,469,568 B2  Page 1 of 1
APPLICATION NO. : 10/558657
DATED : December 30, 2008
INVENTOR(S) : Reissenweber It is certified that error appears in the above-identified patent and that said Letters Patent is hereby corrected as shown below:

Column 6
Lines 18-20, These lines up to "4." Of line 20 should be located before the Detailed Description of the Preferred Embodiments Column 8
Line 24, change "65" to --67--
Line 31, change "support device" to --support part--

Column 10
Line 5, change "a" to --α--

Column 11
Line 3, delete "65"

Column 12
Line 16, delete "one"
Line 38, change "have" to --has--

Column 13
Line 21, change "rotates" to --rotate--

Column 14
Line 11, change "positioning and connecting" to --positioned and connected--
Line 47, delete "one of"

Signed and Sealed this

Thirteenth Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,469,568 B2  Page 1 of 1
APPLICATION NO. : 10/558657
DATED : December 30, 2008
INVENTOR(S) : Reissenweber It is certified that error appears in the above-identified patent and that said Letters Patent is hereby corrected as shown below:

Column 6
Lines 18-20, These lines up to "4." Of line 20 should be located before the Detailed Description of the Preferred Embodiments Column 8
Line 24, change "65 [sic; 67]" to --67--
Line 31, change "support device [sic; support part]" to --support part--

Column 10
Line 5, change "a" to --α--

Column 11
Line 3, delete "65"

Column 12
Line 16, delete "one"
Line 38, change "have" to --has--

Column 13
Line 21, change "rotates" to --rotate--

Column 14
Line 11, change "positioning and connecting" to --positioned and connected--
Line 47, delete "one of"
This certificate supersedes the Certificate of Correction issued October 13, 2009.

Signed and Sealed this

Twenty-second Day of December, 2009

David J. Kappos
*Director of the United States Patent and Trademark Office*